United States Patent [19]
Tanaka et al.

[11] 3,909,468
[45] Sept. 30, 1975

[54] METHOD OF PRODUCING DECOMPOSABLE RESIN MOLDINGS

[75] Inventors: Kenjiro Tanaka; Tadao Shigeta; Nobuyuki Kikkawa; Noriharu Kumura; Katsuhiro Ono, all of Chiba, Japan

[73] Assignee: Idemitsu Kosan Company Ltd., Japan

[22] Filed: Sept. 20, 1973

[21] Appl. No.: 398,995

[30] Foreign Application Priority Data
Sept. 30, 1972 Japan.............................. 47-98137
Nov. 27, 1972 Japan............................ 47-117933

[52] U.S. Cl.......... 260/8; 260/17.4 R; 260/94.9 GD; 260/96 D; 260/DIG. 43; 264/331; 424/33
[51] Int. Cl.$^2$.......................................... C08L 89/00
[58] Field of Search ......... 264/331; 260/DIG. 43, 8, 260/17.4 R, 94.9 GD, 96 D; 424/33

[56] References Cited
UNITED STATES PATENTS

| | | | |
|---|---|---|---|
| 3,051,545 | 8/1962 | Steuber.................. | 260/17.4 ST X |
| 3,567,119 | 3/1971 | Wilbert et al..................... | 424/32 X |
| 3,590,528 | 7/1971 | Shepherd..................... | 260/DIG. 43 |
| 3,647,111 | 3/1972 | Stager et al.................. | 260/DIG. 43 |
| 3,781,264 | 12/1973 | Akin................................ | 260/112 R |

OTHER PUBLICATIONS

Hueck, H. J., Plastics, Oct. 1960, pp. 419–422.
Rodriguez, F., Chem. Tech., July 1971, pp. 408–415.

*Primary Examiner*—Lucille M. Phynes
*Attorney, Agent, or Firm*—McGlew and Tuttle

[57] ABSTRACT

This invention relates to a method of producing new decomposable resin moldings. More particularly, the invention pertains to a method of producing resin moldings given aquatic and microorganic decomposabilities by mixing thermoplastic resin with a microorganism and molding the mixture with heating.

We, inventors found that resin moldings with favourable aquatic and microorganic decomposabilities can be obtained without impairing the property of the resin itself when the thermoplastic resin and microorganism are mixed and the mixture is molded with heating.

Moreover, the mechanical strength of the resin moldings are increased by the method of the present invention.

3 Claims, No Drawings

METHOD OF PRODUCING DECOMPOSABLE RESIN MOLDINGS

BACKGROUND AND SUMMARY OF THE INVENTION

Though plastics have been widely applied as molding material, they are neither corroded nor easily decomposed by microorganisms. Therefore serious environmental pollution may be caused when these plastics are disposed of by dumping, etc. because such plastics maintain their shapes semipermanently.

So far, as one of the methods for solving the environmental pollution caused by disused plastics, it is known to add a monomer easily decomposed by light etc. to the polymer as a component of copolymerization.

However, moldings derived from such copolymer are not recommendable ones because of the defect that the mechanical property of the resin itself is lost, even if they show favourable decomposability.

The inventors have earnestly studied how to develop such moldings as maintain the property of the resin itself and also easily decompose when disposed of. As a result, the inventors found that moldings with favourable aquatic decomposability and microorganic decomposability can be obtained without impairing the property of the resin itself when a thermoplastic resin and a microorganism are mixed and the mixture is molded with heating.

That is to say, the present invention comprises mixing a thermoplastic resin with a microorganism and molding the mixture with heating. Though the amount of microorganism to be added is not specifically limited, ordinarily, it is recommended to add microorganism in the amount of at least 10 percent based on the weight of the mixture.

The product of this invention has aquatic and microorganic decomposabilities as well as favourable mechanical strength.

DETAILED DESCRIPTION OF THE INVENTION

This invention relates to a method of producing new decomposable resin moldings. More particularly, it pertains to a method of producing resin moldings given aquatic and microorganic decomposabilities by mixing a thermoplastic resin with a microorganism and molding the mixture with heating.

Though plastics have been widely applied as a molding material, they are neither corroded nor easily decomposed by microorganisms. Therefore serious environmental pollution may be provoked caused when disposed by dumping etc. because they maintain their shapes semipermanently.

So far, as one of the methods for solving the environmental pollution caused by disused plastics, it is known to add a monomer easily decomposed by light etc. to the polymer as a component of copolymerization.

However, moldings derived from such copolymer are not recommendable ones because of the defect that the mechanical property of the resin itself is lost, even if they have shown favourable decomposability.

The inventors have earnestly studied how to develop such moldings as maintain the property of the resin itself and also easily decompose when disposed of. As a result, the inventors found that moldings with favourable aquatic decomposability and microorganic decomposability can be obtained without impairing the property of resin itself when thermoplastic resin and microorganism are mixed and the mixture is molded with heating.

Thermoplastic resins useful in this invention are polyolefins, particularly polypropylene and polyethylene.

While, bacteria, yeast, mold, algae etc. are used as microorganism, all of these microorganisms contain in their cell bodies various high molecular compounds including protein, carbohydrates, etc. The study by the inventors suggests that these substances exhibit specific activity of giving aquatic decomposability and microorganic decomposability as well as giving favourable mechanical strength to resin moldings when mixed with aforementioned thermoplastic resins as auxiliary additive. This activity is thought to be caused mainly by protein in microorganisms. Though the amount of microorganisms to be added is not specifically limited, ordinarily, it is recommended to add in the amount of at least 10 percent based on the weight of the mixture.

According to the method of this invention, a desirable shape of moldings can be obtained when the aforementioned thermoplastic resin and microorganism are mixed in powder form with mixing means such as V type-blender, ribbon blender, Henschel mixer etc. and the mixture is put in a predetermined shape of mold for compression molding at a temperature of 120°–200°C, preferably 160°–180°C, and at a pressure of 20–400 kg/cm$^2$, preferably 100–200 kg/cm$^2$. The molding method is not limited to compression molding. Desired moldings are obtained by fully kneading the mixture of thermoplastic resin and microorganism with the usual kneading means such as roll, Banbury mixer, extruder etc., forming it to the molding into pellets and molding the mixture with compression, injection, extrusion or calendering molding.

In carrying out the method of this invention, other auxiliary additives in common use, for instance, coloring matter, filler, plasticizer etc. may be added.

The moldings produced according to the method of this invention possess excellent aquatic decomposability and microorganic decomposability because the moldings contain specially selected microorganisms as their component differing from conventional thermoplastic resins. Besides, the production process of this invention is less complicated than that of the aforementioned conventional photolytic moldings and mechanical strength of resin is not decreased at all. On the contrary, mechanical strength shows the tendency of being increased by the use of microorganisms. Furthermore, the moldings of this invention have the advantage that decomposability can be easily adjusted by varying the amount of microorganism.

The moldings of this invention can be advantageously applied to various consumption goods such as sundries of daily use, throwaway containers etc. in suitable forms. The disposal of these moldings is not troublesome because they easily decompose just being buried in the earth.

In the next place, this invention is explained in detail with the following examples.

EXAMPLE 1

Power of high density polyethylene (manufactured by Mitsui Petrochemical Industries, Ltd., Hizex 2100GP) and yeast (protein content: 54%) were homogeneously mixed in mortar in each predetermined amount. This mixture was used as molding material and subjected to compression molding at the temperature of 160°C and at the pressure of 160 kg/cm², thus disc shaped moldings with 100 mm diameter and 5 mm thickness were obtained.

In the next place, the moldings were cut in pieces of 10 × 20 × 5 mm each, then their compressive strength and that after dipping for 3 days and 20 days in water at a room temperature were determined. The results are shown in Table 1. Determination was done at the velocity of 1 mm/min.

Table 1

| | Compressive strength of moldings (kg/cm²) Content of Microorganism (weight%) | | | | | | |
|---|---|---|---|---|---|---|---|
| | 0 | 10 | 30 | 50 | 80 | 90 | 100 |
| Before dipping | 220 | 220 | 260 | 338 | 350 | 550 | 750 |
| After 3 days of dipping | 220 | 210 | 170 | 122 | 62 | * | * |
| After 20 days of dipping | 220 | 200 | 83 | * | * | | |

* Decomposed

As shown from the result in Table 1, moldings with higher compressive strength as well as aquatic decomposability are obtained by using thermoplastic resin containing microorganism as molding material.

What is claimed is:

1. A method of preparing decomposable resin moldings which comprises the step of molding a mixture of polyolefin and yeast with heating at a temperature sufficient to mold said mixture.

2. A method according to claim 1, wherein the molding step is carried out by charging the mixture to a mold, heating said mixture in the mold at a temperature of from 120° to 200°C under a pressure of from 20 to 400 kg/cm² and recovering the resultant resin moldings.

3. A method according to claim 1, wherein the polyolefin is a polyethylene.

* * * * *